No. 783,210.

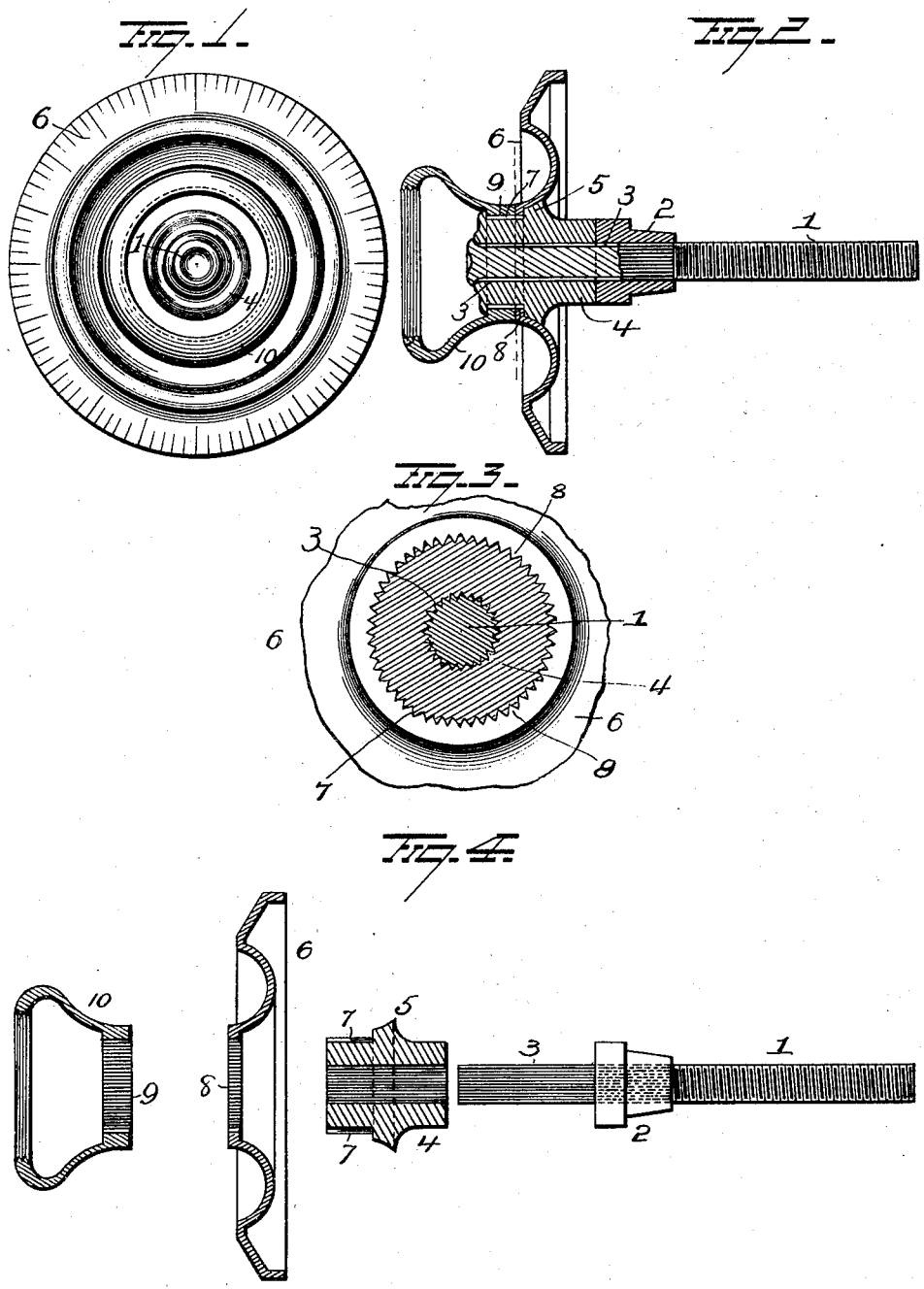

Patented February 21, 1905.

UNITED STATES PATENT OFFICE.

ROLLIN C. LEWIS, OF STAMFORD, CONNECTICUT, ASSIGNOR TO THE YALE & TOWNE MANUFACTURING COMPANY, OF STAMFORD, CONNECTICUT.

DIAL AND KNOB FOR PERMUTATION-LOCKS.

SPECIFICATION forming part of Letters Patent No. 783,210, dated February 21, 1905.

Application filed October 3, 1904. Serial No. 227,006.

*To all whom it may concern:*

Be it known that I, ROLLIN C. LEWIS, of Stamford, in the county of Fairfield and State of Connecticut, have invented certain new and useful Improvements in Dials and Knobs for Permutation-Locks; and I do hereby declare the following to be a full, clear, and exact description of the invention, such as will enable others skilled in the art to which it appertains to make and use the same.

My invention relates to an improvement in dials and knobs for permutation-locks, the object being to provide improved means for rigidly securing the knob and dial to the spindle of the lock, so as to provide a complete structure in which the parts are rigidly secured together against the possibility of displacement or accidental separation and one in which the movement or slipping of any one part with relation to the other is absolutely prevented.

With these ends in view my invention consists in the parts and combinations of parts, as will be more fully explained, and pointed out in the claims.

In the accompanying drawings, Figure 1 is an elevation of my improvement, the outer face of the knob being open to show the spindle and sleeve. Fig. 2 is a view in longitudinal section through the same. Fig. 3 is an enlarged view, in transverse section, between the knob and dial and through the sleeve and spindle; and Fig. 4 shows the several parts detached.

1 represents the operating-spindle of a permutation-lock provided near its outer end with a fixed collar 2, the portion of the spindle from its outer end to its collar being provided with peripheral serrations 3. These serrations 3 extend in the direction of the length of the spindle and are of equal size and located equal distances apart, so that a sleeve 4, similarly serrated in its bore, can be readily placed on the spindle with its serrated face meshing with the serrated face of the spindle, and when so placed is secure against any independent rotary movement on the spindle.

The sleeve 4 is provided on its periphery at a point between its ends with a flange 5, the front face of which is curved to fit within and conform to the contour of the rear face of the dial 6, immediately surrounding the opening in the latter, thus forming a seat against which the dial is solidly supported. The periphery of the portion of the sleeve 4 in front of the flange 5 is also provided with longitudinal serrations 7 of the same size and located equal distances apart, which serrations mesh with corresponding serrations 8, formed in the dial 6, around the central opening in the latter, and also with serrations 9, formed in the neck or shank of the knob 10.

In assembling the parts the sleeve 4 can be first placed on the serrated end of the spindle 1 with its inner end resting against the collar 2, and the dial can then be applied to the sleeve with its rear face in contact with the flange 5, or, if desired, the dial can be applied to the sleeve and the latter then placed on the serrated end of the spindle. After the spindle, sleeve, and dial have been thus assembled the knob is placed on the serrated end of the sleeve with the serrations in the knob meshing with the serrations in the sleeve, after which the outer end of the spindle, which projects slightly beyond the sleeve, is upset or spun over the sleeve, so as to lock the sleeve on the spindle, and the outer edge of the sleeve, which projects forwardly slightly in advance of the inner face of the shank of the knob, is upset or spun over the adjacent face of the knob, thus permanently locking the knob to the sleeve.

With the parts thus constructed they may be easily and quickly assembled, and when secured as explained there is no possibility whatever of any slipping of the parts or any rotary movement of any part independently of the others.

It is evident that many slight changes might be resorted to in the relative arrangement of parts herein shown and described without departing from the spirit and scope of my invention. Hence I would have it understood that I do not wish to confine myself to the exact construction herein shown and described; but, Having fully described my invention, what I claim as new, and desire to secure by Letters Patent, is—

1. The combination with a spindle having a fixed collar and a serrated end, of a sleeve having a serrated bore adapted to receive the serrated end of the spindle and bearing at its inner end against said collar, and a knob secured on said sleeve.

2. The combination with a spindle and sleeve thereon the latter having a serrated periphery, of a dial having serrations around its central opening and a knob having a serrated shank, the serrations in the knob and dial meshing with the serrations on the sleeve.

3. The combination with a spindle having a serrated end, of a sleeve having a serrated bore to receive the serrated end of the spindle, a dial having serrations around its central opening to engage the peripheral serrations on the sleeve and a knob having a shank provided with serrations which engage the serrations on the sleeve.

4. The combination of a spindle, a sleeve thereon, and a knob on the sleeve, the said parts being secured together by upsetting the end of the spindle over the sleeve and the end of the sleeve over the adjacent face of the knob.

5. The combination with a spindle and a sleeve secured thereon, the said sleeve having a flange, and serrations in front of the flange, of a dial having serrations around its central opening and a knob having serrations in its shank the serrations in said knob and dial meshing with the serration in the sleeve.

6. The combination of a spindle, a sleeve thereon, and a dial and knob mounted on the sleeve, the said parts being secured together by upsetting the end of the spindle over the sleeve and the end of the sleeve over the adjacent face of the knob.

7. The combination of a spindle, a sleeve thereon, and a dial and knob mounted on the sleeve, the said parts having intermeshing serrated faces and secured together by upsetting the end of the spindle over the sleeve and the end of the sleeve over the adjacent face of the knob.

8. The combination of a spindle having a collar thereon a flanged sleeve mounted on said spindle and bearing against said collar, a dial mounted on the sleeve against the flange and a knob on the sleeve in front of the dial the said spindle, sleeve, dial and knob having intermeshing serrated surfaces and secured together by upsetting the end of the spindle over the outer end of the sleeve, and the outer end of the sleeve over the adjacent face of the knob.

9. The combination of a spindle, a sleeve thereon and a knob on said sleeve, the said sleeve and spindle having intermeshing serrated faces and secured together by upsetting the end of the spindle over the adjacent face of the sleeve.

10. The combination of a spindle, a sleeve thereon and a knob and dial on said sleeve, the said sleeve and spindle having intermeshing serrated faces and secured together by upsetting the end of the spindle over the adjacent face of the sleeve.

11. The combination with a sleeve having an external flange or shoulder thereon, of a dial and knob mounted on said sleeve in front of the flange and secured thereon by upsetting the end of the sleeve over the adjacent face of the knob.

12. The combination with a sleeve having an external flange or shoulder and external serrations, of a knob having internal serrations intermeshing with the serrations on the sleeve, and secured to the sleeve by upsetting the end of the sleeve over the adjacent face of the knob.

In testimony whereof I have signed this specification in the presence of two subscribing witnesses.

ROLLIN C. LEWIS.

Witnesses:
 W. H. TAYLOR,
 C. E. VAIL.